(12) United States Patent
Inoue

(10) Patent No.: US 6,987,503 B2
(45) Date of Patent: Jan. 17, 2006

(54) ELECTROPHORETIC DISPLAY

(75) Inventor: Satoshi Inoue, Nagano (JP)

(73) Assignee: Seiko Epson Corporation (JP)

( * ) Notice: Subject to any disclaimer, the term of this patent is extended or adjusted under 35 U.S.C. 154(b) by 537 days.

(21) Appl. No.: 09/941,541

(22) Filed: Aug. 29, 2001

(65) Prior Publication Data

US 2002/0033792 A1   Mar. 21, 2002

(30) Foreign Application Priority Data

Aug. 31, 2000   (JP) ........................................ 2000-263565
Aug. 1, 2001   (JP) ........................................ 2001-233811

(51) Int. Cl.
*G09G 3/34*   (2006.01)

(52) U.S. Cl. ..................... 345/107; 359/296; 204/600
(58) Field of Classification Search ................ 345/107, 345/84, 85, 86, 87, 92, 55; 359/197, 296; 204/600
See application file for complete search history.

(56) References Cited

U.S. PATENT DOCUMENTS

| | | | |
|---|---|---|---|
| 6,373,461 B1 | 4/2002 | Hasegawa et al. | |
| 6,524,153 B1 * | 2/2003 | Ikeda et al. | 445/24 |
| 6,683,333 B2 * | 1/2004 | Kazlas et al. | 257/197 |
| 2002/0036616 A1 | 3/2002 | Inoue | |

FOREIGN PATENT DOCUMENTS

| | | |
|---|---|---|
| DE | 199 02 030 | 7/1999 |
| EP | 1 000 741 | 5/2000 |
| EP | 1 286 326 A1 | 2/2003 |
| JP | 50-51695 | 8/1975 |
| JP | 51-41994 | 8/1976 |
| JP | 04-204628 | 7/1992 |
| JP | 8-30223 | 2/1996 |
| JP | 2000-035775 | 2/2000 |
| JP | 2000-221546 | 8/2000 |
| JP | 2000-285219 | 10/2000 |
| JP | 2002-014379 | 1/2002 |
| WO | WO 01/091096 | 8/2003 |

OTHER PUBLICATIONS

Communication from European Patent Office regarding counterpart application.
**Microencapsulated Electrophoretic Rewritable Sheet; H. Kawai, N. Kanae; SID 99 Digest; pp. 1102–1105.
Microencapsulated Electrophoretic Rewritable Sheet; H. Kawai, N. Kanae; SID 99 Digest; pp. 1102–1105.
A Printed and Rollable Bistable Electronic Display; P. Drzaic, B. Comiskey, J.D. Albert, L. Zhang, A. Loxley; R. Feeney; SID 98 Digest; pp. 1131–1134.
Communication from Japanese Patent Office re: related application.

* cited by examiner

*Primary Examiner*—Regina Liang
*Assistant Examiner*—Jennifer T. Nguyen
(74) *Attorney, Agent, or Firm*—Harness, Dickey & Pierce, P.L.C.

(57) ABSTRACT

An electrophoretic display using electrophoretic ink is configured by a transparent substrate, a common electrode, pixel electrodes, and thin-film transistors. An electrophoretic ink layer, which is arranged between the common electrode and pixel electrodes, is actualized by a linear arrangement of microcapsules each of which contains negatively charged white particles dispersed in a liquid having a specific color. All the pixel electrodes are simultaneously set to the low electric potential while the common electrode is set to the high electric potential so that the display content is erased from the entire area of the display surface at once, and then the pixel electrodes are driven respectively in response to display data while the common electrode is set to the low electric potential so that the display content is rewritten with a new one in response to the display data.

13 Claims, 13 Drawing Sheets

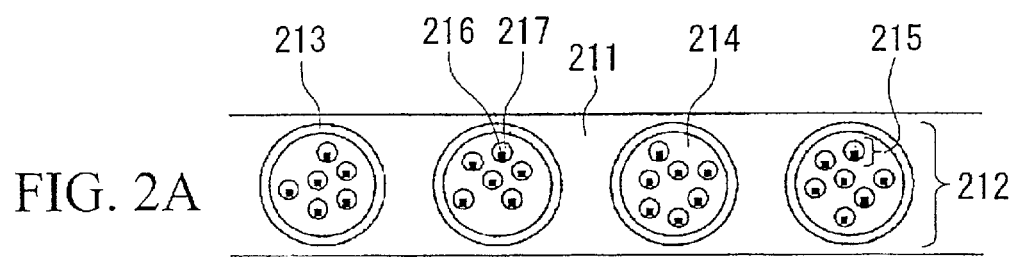
FIG. 2A
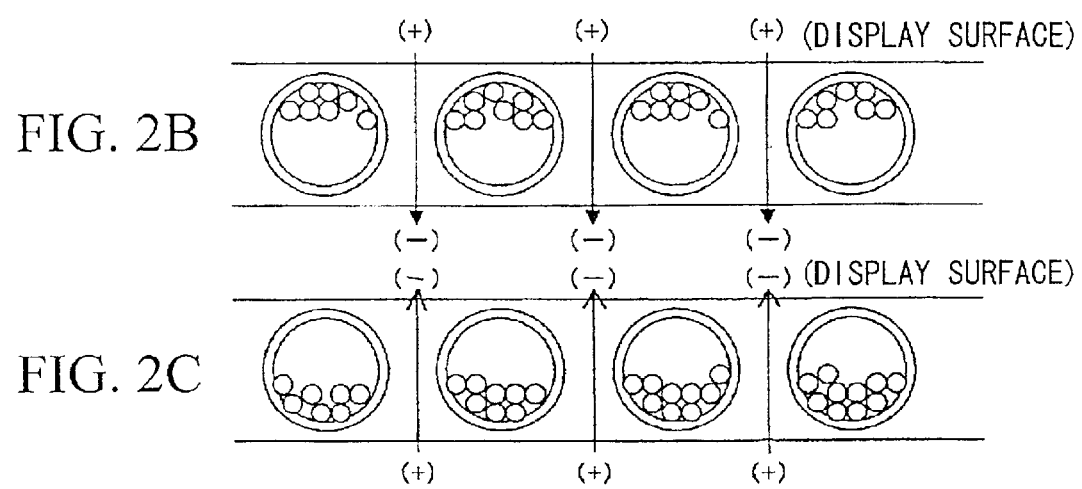
FIG. 2B
FIG. 2C

ELECTROPHORETIC DISPLAY

BACKGROUND OF THE INVENTION

1. Field of the Invention

This invention relates to displays such as liquid crystal displays, and particularly to electrophoretic displays that display images using display media such as electrophoretic ink in accordance with electrophoretic effects.

2. Description of the Related Art

Conventionally, electrophoretic effects are well known among scientists and engineers, wherein charged particles dispersed in a fluid or liquid medium move under the influence of an electric field. As an example of the application of the electrophoretic effects, engineers try to realize displays by using charged pigment particles that are dispersed and contained in dyed solution arranged between a pair of electrodes. Under the influence of an electric field, the charged pigment particles are attracted to one of the electrodes, so that desired images will be displayed. The dyed solution in which charged pigment particles are dispersed is called electrophoretic ink, and the display using the electrophoretic ink is called an electrophoretic display (abbreviated as 'EPD').

Each of the charged pigment particles has a nucleus that corresponds to a rutile structure such as $TiO_2$, for example. The nucleus is covered by a coating layer made of polyethylene, for example. As solvents, it is possible to use a solution dissolving ethylene tetrachloride, isoparaffin, and anthraquinone dye, for example. The charged pigment particles and the solvents each have different colors. For example, the charged pigment particles are white, while the solvents are blue, red, green, or black, for example. At least one of the electrodes is formed as a transparent electrode.

Applying an electric field to the electrophoretic ink externally, if the pigment particles are negatively charged, they move in a direction opposite to a direction of the electric field. Thus, the display produces a visual representation such that one surface of the display being observed through the electrophoretic ink seems to be colored in either the color of the solvent or the color of the charged pigment particles. By controlling the movement of charged pigment particles in each pixel, it is possible to represent visual information on the display surface of the display.

The solvent and the charged pigment particles both have approximately the same specific gravity. For this reason, even if the electric field disappears, the charged pigment particles can maintain their positions, which are fixed by the application of the electric field, for a relatively long time, which may range from several minutes to twenty minutes, for example. Because of the aforementioned property of the charged pigment particles of the electrophoretic ink, it is possible to anticipate low power consumption by the electrophoretic display. In addition, the electrophoretic display is advantageous because of the high contrast and very large viewing angle, which reaches approximately ±90 degrees. Generally speaking, a human observer is inevitably required to directly view colors of pigments and/or colors of dyes in the electrophoretic display. Whereas the liquid crystal display of the transmission type requires the human observer to view light from fluorescent tubes of the back light, the electrophoretic display can produce visually subtle colors and shades, which are gentle on the human eyes. In addition, the electrophoretic ink is inexpensive compared to liquid crystal. Further, the electrophoretic display does not need a back light. Therefore, it is anticipated that electrophoretic displays can be manufactured at the relatively low cost.

In spite of the aforementioned advantages, manufacturers could not actually produce electrophoretic displays for practical use because of low reliability in operation due to cohesion of charged pigment particles. However, recent advances in technology have shown that the reliability can be improved by using microcapsules filled with electrophoretic ink. Therefore, electrophoretic displays have recently suddenly become a focus of interest.

Various papers and monographs have been written with regard to concrete examples of displays using electrophoretic ink encapsulated in microcapsules. For example, it is possible to list two papers, namely, a first paper entitled "44.3L: A Printed and Rollable Bistable Electronic Display" that is written by P. Drzaic et al for the SID 98 DIGEST 1131, and a second paper entitled "53.3: Microencapsulated Electrophoretic Rewritable Sheet" that is written by H. Kawai et al for the SID 99 DIGEST 1102.

The aforementioned first paper describes that four types of layers are sequentially printed on a polyester film, that is, a transparent conductive plate, an encapsulated electrophoretic ink layer, a patterned conductive layer of silver or graphite, and an insulation film layer. In short, the first paper proposes a 'flexible' display in which a hole (or holes) is open on the insulating film to allow designation of an address (or addresses) for the patterned conductive layer and to allow provision of a lead line (or lead lines). The second paper proposes a rewritable sheet that operates based on the electrophoresis by using the microencapsulated electrophoretic ink, and it also proposes a method for writing information onto the sheet. In addition, it is possible to propose a display in which a surface of an active-matrix type array of elements such as the low-temperature processed polysilicon thin-film transistors (TFT) is coated with the electrophoretic ink. Thus, it is possible to provide the 'visually subtle and gentle' display that is also reduced in consumption of electricity.

FIG. 1 shows a structure of the selected section of the electrophoretic display with respect to each pixel. The display uses two substrates 111 and 112, which are fixed by bonding and are arranged opposite to each other. A common electrode 113 is formed just below the substrate 112, under which a pixel electrode 114 is formed. An electrophoretic ink layer 115 containing plenty of microcapsules of electrophoretic ink is formed between the common electrode 113 and the pixel electrode 114. The pixel electrode 114 is connected to a drain electrode 117 of a thin-film transistor (TFT) 116 in series. The TFT 116 plays a role as a switch. At least one of the common electrode 113 and pixel electrode 114 is made by a transparent electrode, which corresponds to a display surface to be visually observed by a person or human operator.

The TFT 116 contains a source layer 119, a channel 120, a drain layer 121, and a gate insulation film 122 that are formed on an embedded insulation film 118. In addition, it also contains a gate electrode 123 formed on the gate insulation film 122, a source electrode 124 formed on the source layer 119, and a drain electrode 117 formed on the drain layer 121. Further, the TFT 116 is covered with an insulation film 125 and another insulation film 126 respectively.

Next, the internal structure and operation of the electrophoretic ink layer 115 will be described with reference to FIGS. 2A to 2C. The electrophoretic ink layer 115 is formed by a transparent binder 211 having light transmittance and plenty of microcapsules 212. The microcapsules 212 are distributed uniformly in the inside of the binder 211 in a fixed state. The thickness of the electrophoretic ink layer 115 is 1.5 to 2 times as large as external diameters of the microcapsules 212. As the material for the binder 211, it is possible to use silicone resin and the like. Each microcapsule 212 is defined by a capsule body 213 that has a hollow spherical shape and transmits light. The inside of the capsule body 213 is filled with liquid (or solvent) 214, in which negatively charged particles 215 are dispersed. Each of the charged particles 215 has a nucleus 216 that is coated with a coating layer 217. Each charged particle 215 and the liquid 214 mutually differ from each other in color. That is, different colors are set to them respectively. For example, the charged particles 215 are white, while the liquid 214 is blue, red, green or black. Additionally, approximately the same specific gravity is set for both of the liquid 214 and charged particles 215 within the microcapsule 212.

When an electric field is applied to the microcapsules 212 externally, the charged particles 215 move within the microcapsules 212 in directions opposite to the direction of the electric field. If the display surface of the display presently corresponds to an upper surface of the substrate 112 shown in FIG. 1, the charged particles 215 move upwards within the microcapsules 212 of the electrophoretic ink layer 115, which is shown in FIG. 2B. In that case, it is possible to observe the color (i.e., white) of the charged particles 215 that are floating upwards above the background color, which corresponds to the color (e.g., blue, red, green, or black) of the liquid 214. In contrast, if the charged particles 215 move downwards due to the application of an electric field to the microcapsules 212 of the electrophoretic ink layer 115 shown in FIG. 1, the display allows only the color (e.g., blue, red, green, or black) of the liquid 214 to be observed, which is shown in FIG. 2C. Once the charged particles 215 are moved in directions opposite to the direction of the electric field applied to the microcapsules 212, they will likely maintain the same positions within the microcapsules 212 for a relatively long time after the electric field disappears because they have approximately the same specific gravity as that of the liquid 214. That is, once the color of the charged particles 215 or the color of the liquid 214 appears on the display surface, it is maintained for several minutes or several tens of minutes. In short, the electrophoretic display has a memory for retaining colors of images. Therefore, by controlling the application of an electric field with respect to each of the pixels, it is possible to provide specific electric-field application patterns, by which information is to be displayed. Once the information is displayed on the display surface of the electrophoretic display, it is maintained on the display surface for a relatively long time.

However, the following problems are left unsolved in the electrophoretic display that is made by the combination of the electrophoretic ink and active-matrix type array of elements.

The drive voltage (or potential difference) that is needed for changing over the display content depends upon the sizes (i.e., diameters) of the microcapsules, and it is estimated to be 1 V/ m or so. Generally, the microcapsules have prescribed diameters that range within several tens of microns, for example. In consideration of the prescribed diameters of the microcapsules, the drive voltage is estimated at 10V or so. Suppose that the drive voltage is set to 10V in the electrophoretic display, which is driven by the known drive method typically employed by liquid crystal displays. In addition, the constant voltage of 10V is applied to the common electrode 113, while the prescribed voltage of 0V or 20V is applied to the pixel electrode 114. That is, the prescribed voltage applied to the pixel electrode 114 (hereinafter, simply referred to as 'pixel electrode drive voltage') is set to 0V in order to increase the potential of the common electrode 113 to be higher than the potential of the pixel electrode 114. The pixel electrode drive voltage is set to 20V in order to increase the potential of the pixel electrode 114 to be higher than the potential of the common electrode 113. Switching over the pixel electrode drive voltage allows the electrophoretic display to rewrite its display content. Actually, the TFT 116 is used to switch over the pixel electrode drive voltage. In practice, however, if the electrophoretic display is driven as described above, the drive voltage is increased too high to ensure satisfactory reliability in the switching operation of the TFT 116. In addition, the pixel electrode drive voltage of 20V is only the least estimated voltage. In other words, an electrophoretic display for practical use may have an increased pixel electrode drive voltage of 30V or more. If the pixel electrode drive voltage is increased very high, it becomes more difficult to ensure satisfactory reliability in the switching operation of the TFT.

Another typical drive method for use in liquid crystal displays is to vary the potential of the common electrode as well, which is normally called 'common voltage swing'. Specifically, the pixel electrode drive voltage is set to 0V while the voltage applied to the common electrode (hereinafter, simply referred to as 'common electrode drive voltage') is set to 10V in order to increase the potential of the common electrode to be higher than the potential of the pixel electrode. Alternatively, the pixel electrode drive voltage is set to 10V while the common electrode drive voltage is set to 0V in order to increase the potential of the pixel electrode to be higher than the potential of the common electrode. Adequately switching over the pixel electrode drive voltage and common electrode drive voltage allows the electrophoretic display to rewrite its display content. Thus, it is possible to improve the reliability in the switching operation of the TFT.

The aforementioned drive method has a problem, which will be described below.

Suppose that the common electrode drive voltage is set to 10V while the pixel electrode drive voltage is set to 0V in order to rewrite the display content with respect to a certain pixel of the display. In order to prevent other pixels from being mistakenly rewritten in display content, the voltage of 10V should be applied to all other pixel electrodes of the display. Normally, the voltage is applied to the pixel electrodes by sequentially selecting transistors for the pixels. Therefore, it is difficult to perfectly match the voltage applying timing for the prescribed pixel electrode with the voltage applying timing for the common electrode. For this reason, a delay may be caused to occur between these timings. Due to such a delay, there is a possibility that an error will occur in rewriting the display content of the display. Although the appropriate voltage is applied to the pixel electrode at a good timing before the occurrence of an error in rewriting the display content, there is still a possibility that an error will occur in rewriting the display content because of the gradual reduction of the voltage applied to the pixel electrode, which is caused by electromagnetic leakage from the pixel transistor.

SUMMARY OF THE INVENTION

It is an object of the invention to provide an electrophoretic display of an active-matrix type that can be driven without error during rewriting of display contents for pixels, thus yielding highly reliable operation.

This invention provides an electrophoretic display using electrophoretic ink comprising a transparent substrate, a common electrode, pixel electrodes, and switching elements such as thin-film transistors. It is preferable to use low-temperature processed polysilicon thin-film transistors in consideration of the mobility (or portability) and the capability of incorporating drivers. In order to reduce the manufacturing cost, it is preferable that at least channels of the thin-film transistors are formed by organic films. An electrophoretic ink layer, which is arranged between the common electrode and pixel electrodes, is actualized by a linear arrangement of microcapsules each of which contains negatively charged white particles dispersed in a liquid having a specific color. Applying the prescribed voltage between the common electrode and pixel electrodes, the negatively charged particles move upwards or downwards within the microcapsules when being attracted to either the common electrode or the pixel electrodes under the influence of an electric field. Therefore, it is possible to observe the color of the negatively charged particles or the color of the liquid emerging on the display surface.

All the pixel electrodes are simultaneously set to the low electric potential while the common electrode is set to the high electric potential so that the display content is erased from the entire area of the display surface at once. In this case, the display surface is entirely white because the negatively charged particles move upwards within the microcapsules when attracted to the common electrode. Then, the pixel electrodes are driven respectively in response to display data while the common electrode is set to the low electric potential so that the display content is rewritten with a new one in response to the display data. Due to the aforementioned processes, it is possible to ensure rewriting of the display content without error.

Because the negatively charged particles and the liquid are both approximately set to the same specific gravity, the negatively charged particles can maintain their positions within the microcapsules after the electric field disappears. Hence, it is possible for the display content to remain on the display surface for a relatively long time.

BRIEF DESCRIPTION OF THE DRAWINGS

These and other objects, aspects, and embodiments of the present invention will be described in more detail with reference to the following drawing figures, in which:

FIG. 2A diagrammatically shows a linear arrangement of microcapsules each containing liquid, charged particles and their nucleuses in an electrophoretic ink layer shown in FIG. 1;

FIG. 2B diagrammatically shows that the charged particles move upwards within the microcapsules due to the application of an electrical field in one direction;

FIG. 2C diagrammatically shows that the charged particles move downwards within the microcapsules due to the application of an electrical field in another direction;

DESCRIPTION OF THE PREFERRED EMBODIMENT

This invention will be described in further detail by way of examples with reference to the accompanying drawings.

Figure 3:
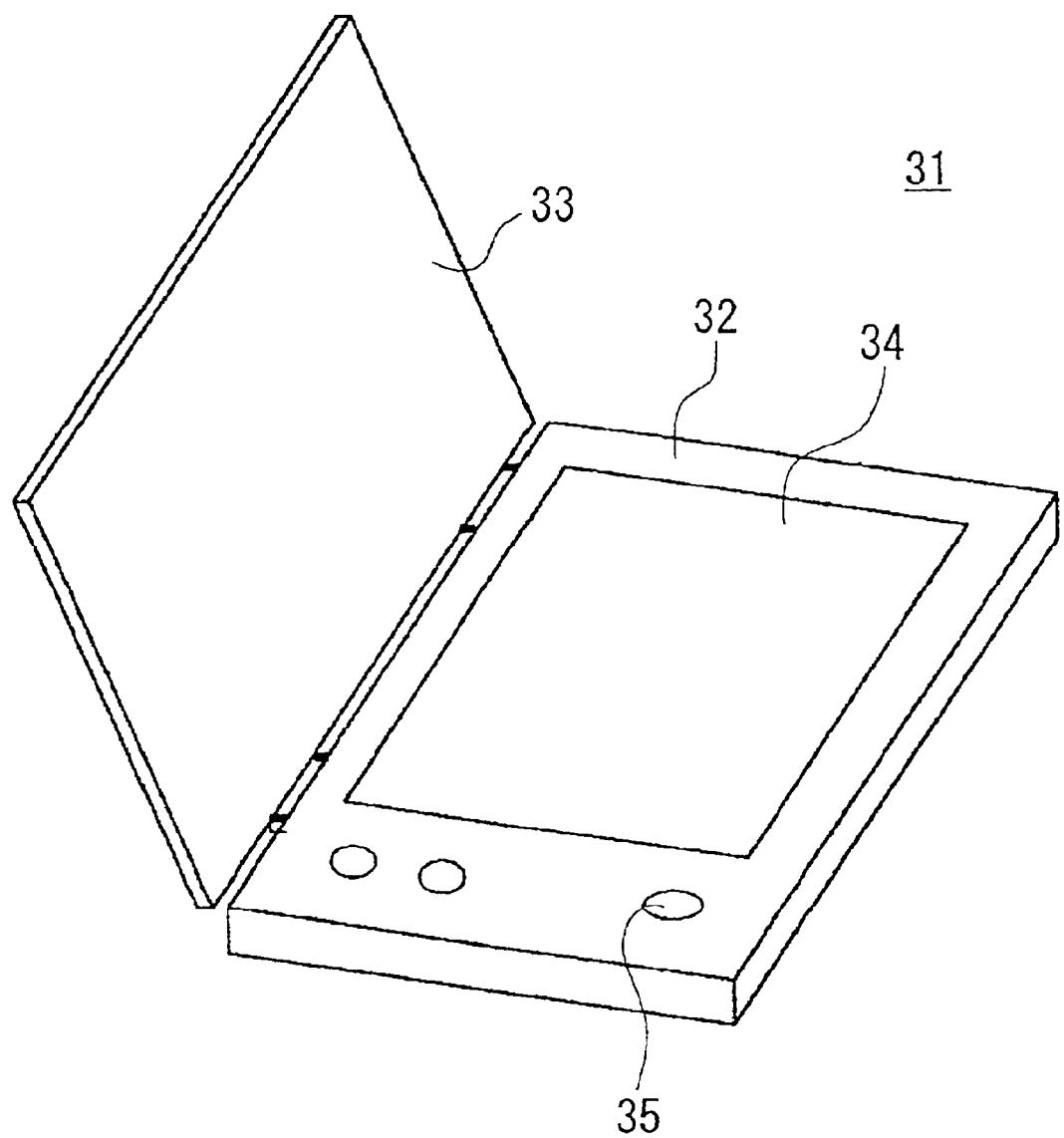
FIG. 3 is a perspective view showing an external appearance of an electronic book that uses an electrophoretic display in accordance with the invention.
Figure 4:
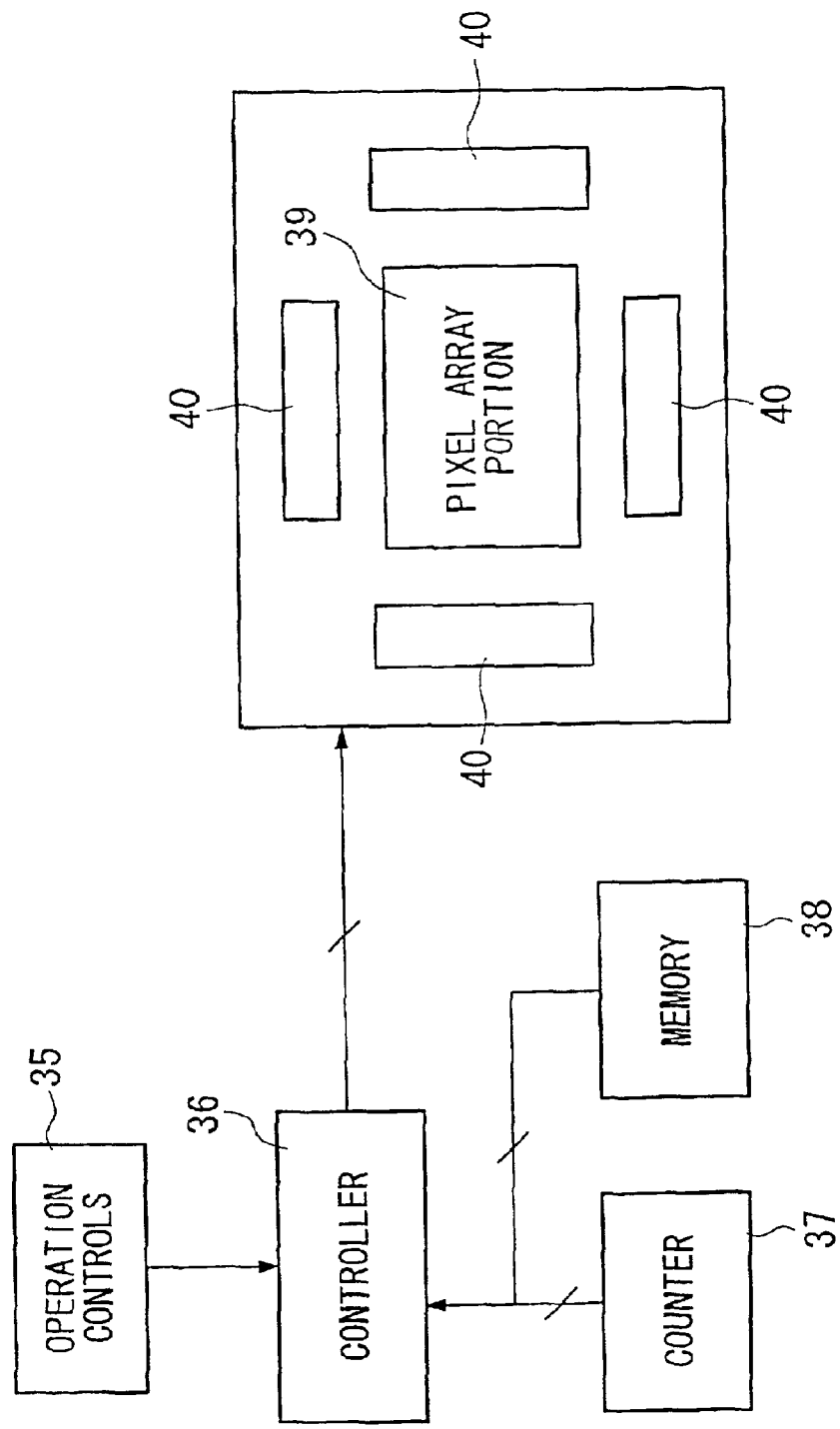
FIG. 4 is a block diagram showing an electrical configuration of the display shown in FIG. 3.

An electrophoretic display of this invention can be applied to electronic books, an example of which is shown in FIG. 3. That is, FIG. 3 shows a brief appearance of an electronic book 31 employing the electrophoretic display of this invention. The electronic book 31 is basically constructed by a frame 32 and an open/close cover 33. A display 34 is installed in the frame 32 such that its display surface is exposed outside, and it is controlled by switches or buttons arranged in an area for operation controls 35. Inside of the frame 32, there are provided a controller 36, a counter 37 and a memory 38, which are shown in FIG. 4. The display 34 provides a pixel array portion 39 that is formed by filling thin-film elements with electrophoretic ink, and peripheral circuits 40 whose circuit elements are integrated. The pixel array portion 39 and its peripheral circuits 40 are combined and unified together within the same unit of the display 34. The peripheral circuits 40 contain scan drivers and data drivers that operate in accordance with the prescribed decoding system.

Figure 5:
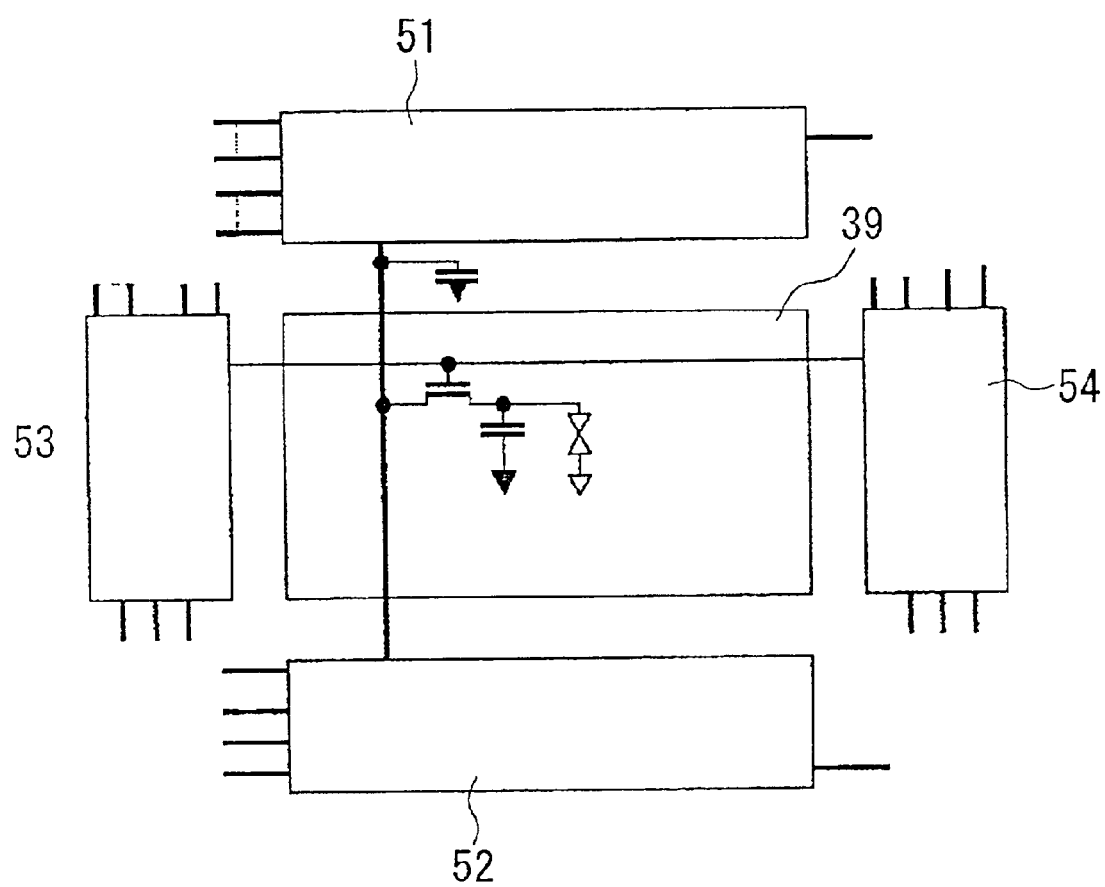
FIG. 5 is a simplified block diagram showing connections between a pixel array portion and its peripheral circuits corresponding to data drivers and scan drivers.

Next, the peripheral circuits 40 made by integrated circuits, which are unified together with the pixel array portion 39, will be described with reference to FIGS. 5 to 7. The pixel array portion 39 is made in a matrix form defined by horizontal lines and vertical lines, namely scan lines and data lines. Therefore, the peripheral circuits 40 provide four drivers in connection with these lines of the pixel array portion 39, which is shown in FIG. 5. Specifically, a pair of data drivers 51 and 52 are connected to both ends of data lines, and a pair of scan drivers 53 and 54 are connected to both ends of scan lines.

Figure 6:
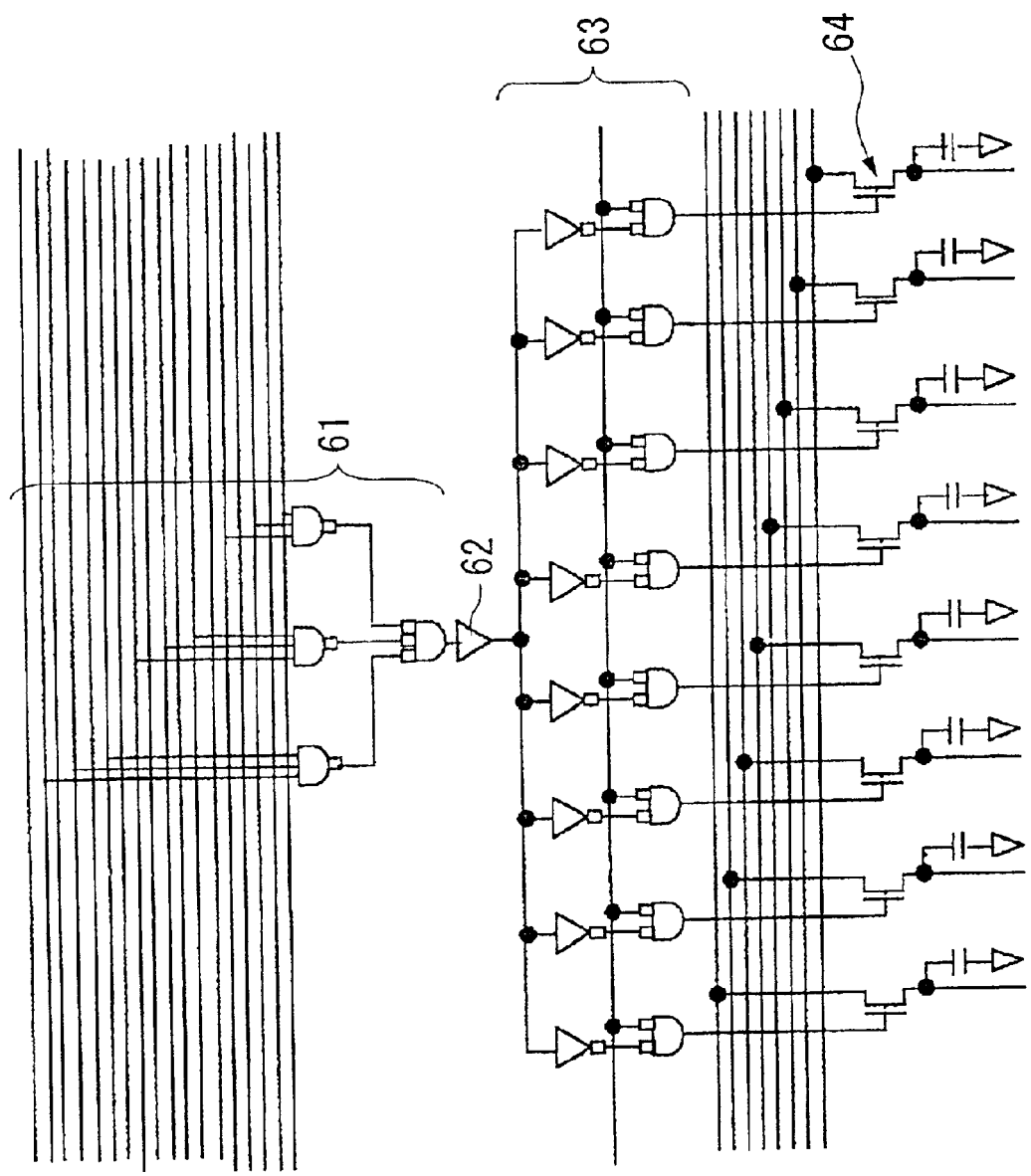
FIG. 6 is a logical circuit diagram showing details of the data driver.

FIG. 6 shows a detailed circuit configuration for the data drivers 51 and 52 respectively. That is, each data driver is configured by a 9-bit decoder 61, a level shifter 62, a combination of buffers and AND gate switches 63, and analog sample-hold thin-film transistors 64. The decoder 61 is configured by three NAND gates and one NOR gate, which are connected with eighteen address signal lines. An output of the decoder 61 is connected to eight buffers by way of the level shifter 62. Therefore, the decoder 61 outputs an address signal simultaneously to eight data lines by way of the eight buffers and their AND gate switches 63 respectively. Thus, eight analog sample-hold thin film transistors 64 are simultaneously switched over in response to the address signal. As a result, eight data are simultaneously and respectively transferred to eight hold capacitors. The aforementioned circuit configuration is suited to reduce operation speeds of the data drivers 51 and 52.

Figure 7:
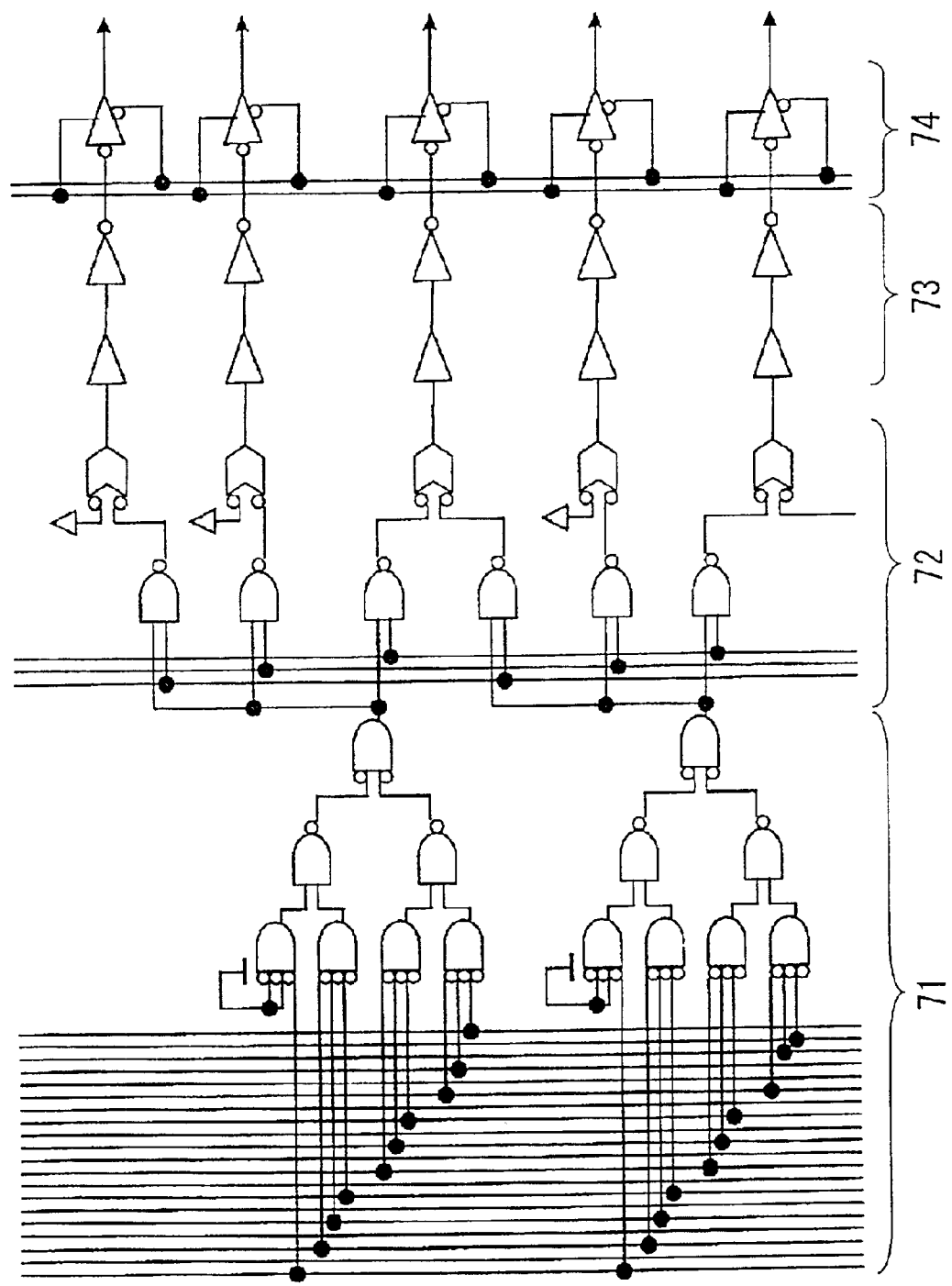
FIG. 7 is a logical circuit diagram showing details of the scan driver.

FIG. 7 shows a detailed circuit configuration for the scan drivers 53 and 54 respectively. That is, each scan driver comprises a 10-bit decoder 71, an interlaced switch circuit 72, a level shifter 73, and an output buffer 74. This circuit configuration is drawn in response to a simultaneous scan mode in which two lines are simultaneously scanned and/or a non-interlaced scan mode. In order to achieve scanning in these scan modes, three control signals A, B, and C are applied to the interlaced switch circuit 72. By simultaneously scanning two lines, it is possible to increase resolution in a vertical direction on the display surface without raising the scan rate. Since each one pair of scan lines are simultaneously selected, combinations of paired scan lines are to be switched over between two states.

As described above, the data drivers 51, 52 and the scan drivers 53, 54 operate in accordance with the prescribed decoding system. Therefore, the pixel array portion 39 is merely required to control the electrophoretic ink layer 115 in such a manner that the display content is rewritten with respect to the pixel for which display data is to be updated. This guarantees reduction of power consumption by the electrophoretic display when it is used in an electronic book.

Next, a description will be given with respect to data update operations of the electrophoretic display with reference to FIG. 1 and FIGS. 2A to 2C. Suppose that the common electrode 113 is arranged in proximity to the display surface, and 'white' particles 215 being negatively charged are dispersed in 'black' liquid 214 within the microcapsules 212 as shown in FIG. 2A. When the electric potential of the pixel electrode 114 is made 'positive' as compared with the common electrode 113, the black color of the liquid 214 of the microcapsules 212 emerges on the display surface as shown in FIG. 2C. In contrast, when the electric potential of the common electrode 113 is made 'positive' as compared with the pixel electrode 114, the white color of the charged particles 215 emerges on the display surface as shown in FIG. 2B.

Figure 8:
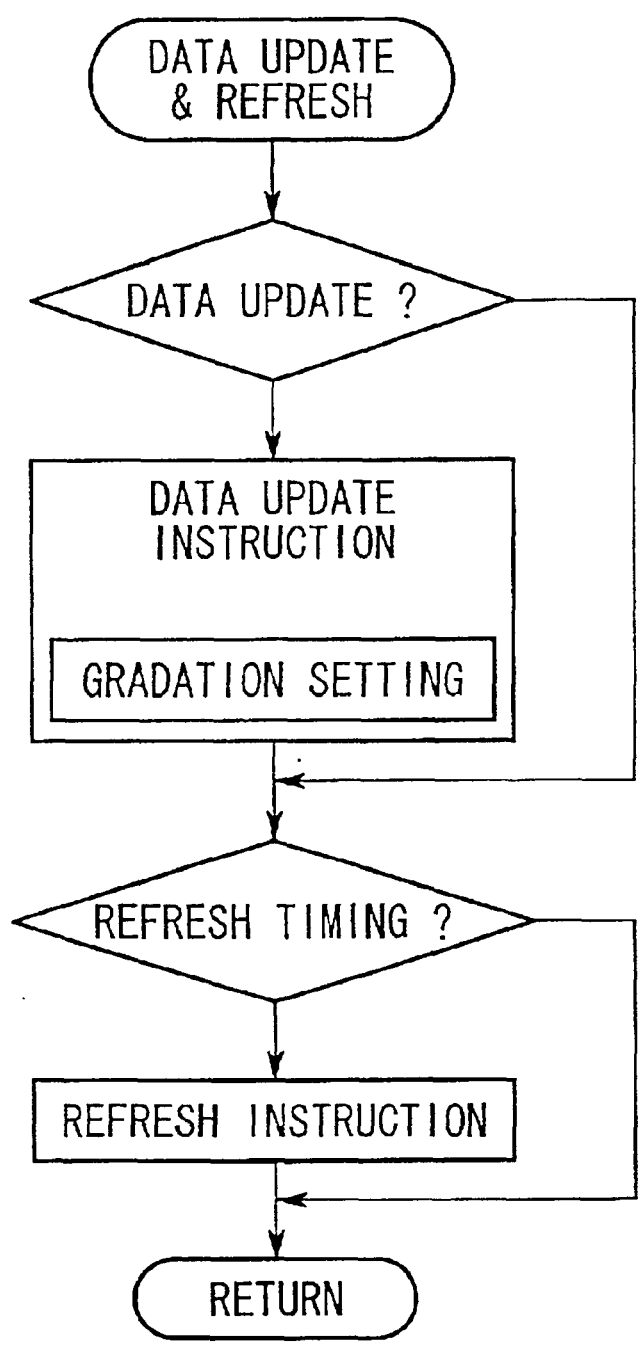
FIG. 8 is a flowchart showing a display content rewriting process executed by a controller of the display shown in FIG. 4.

The controller 36 shown in FIG. 4 performs a display content rewriting process in accordance with a flowchart of FIG. 8. At first, the controller 36 erases all display data that have been displayed over an entire area of the display surface. Concretely speaking, all the pixel electrodes are set to the same electric potential (e.g., ground potential or Vss), then, 'positive' voltages are applied to the common electrode. This makes the entire area of the display surface to be colored white; in other words, it is possible to erase the overall display content that has been displayed on the display surface. That is, the display 34 has the specific reference color that is white.

Next, the display 34 proceeds to rewriting old display contents with new ones on the display surface. That is, the controller 36 reads new display data from the memory 38; then, it issues instructions to write the new display data to the electrophoretic ink layer 115 with respect to pixels of the pixel array portion 39 respectively. Specifically, the ground potential or Vss is applied to the common electrode 113; then, the controller 36 proceeds to selection of pixels by means of the aforementioned drivers 51 to 54 of the prescribed decoding system, so that the new display data are to be rewritten with respect to the pixel electrodes 114 respectively. In order to display the white color on the entire area of the display surface, for example, low voltage corresponding to the same voltage (e.g., ground potential or Vss) of the common electrode 113 is applied to the pixel electrodes 114. In order to display the black color on the entire area of the display surface, high voltage that is 'positive' as compared with the electric potential of the common electrode 113 is applied to the pixel electrodes 114.

It is possible to propose another drive method for the purpose of the reduction of electricity consumed by the display 34 That is, the controller 36 selects only the pixels that are used to display the black color, to which display data are to be written, without selecting other pixels that are used to display the white color. This method can be easily realized by using the aforementioned drivers 51 to 54 of the prescribed decoding system. Using the electrophoretic ink, it is possible to actualize a display of a reflection type having a high contrast ratio. In addition, this display can reduce consumption of electricity because it does not require the back light.

The aforementioned process is executed every time the display 34 rewrites its display content on the display surface. As described above, the display using the electrophoretic ink can be easily applied to electronic books because it has memory for retaining its display content for a while. The aforementioned drive method is preferable for use in electronic books using electrophoretic displays.

In consideration of the mobility (or portability) and the capability of incorporating drivers, it is preferable to use the low-temperature processed polysilicon thin-film transistors for the electrophoretic display of this invention. In addition, it is also preferable that at least channels of thin-film transistors are formed by organic films in order to further reduce the manufacturing cost.

The electrophoretic display of this invention is not necessarily limited to the aforementioned embodiment corresponding to the electronic book, hence, it is possible to propose a variety of modifications.

Figure 1:
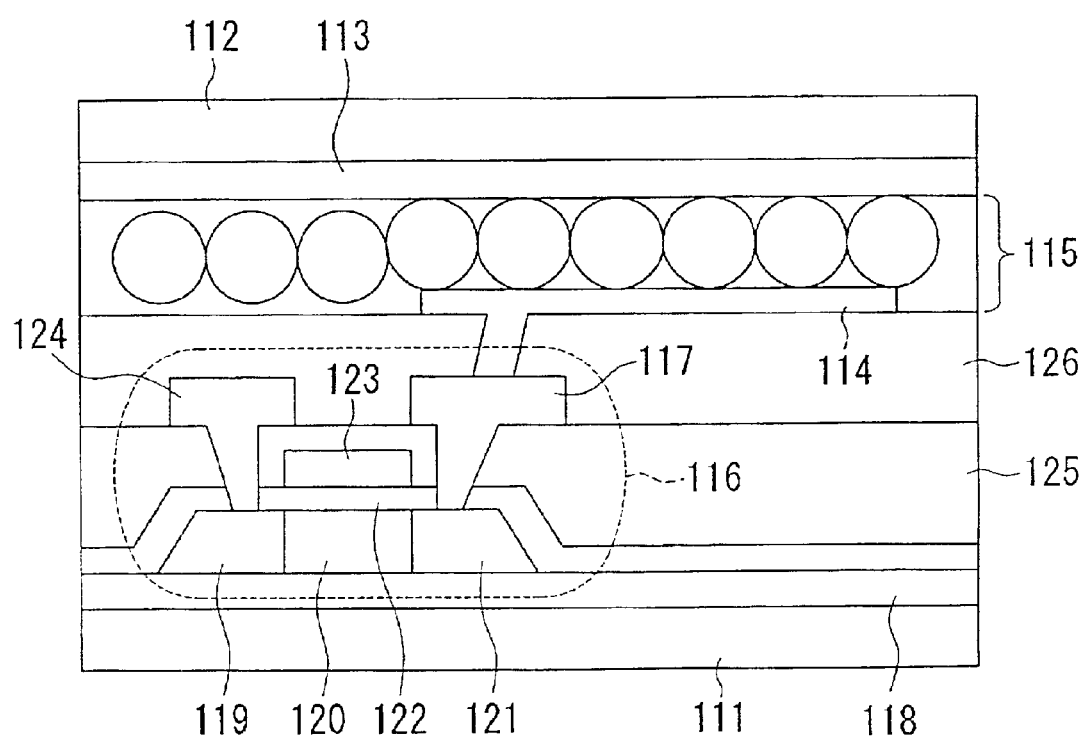
FIG. 1 is a sectional view showing a structure of a selected part of an electrophoretic display of an active-matrix type using electrophoretic ink with respect to a pixel.
Figure 9:
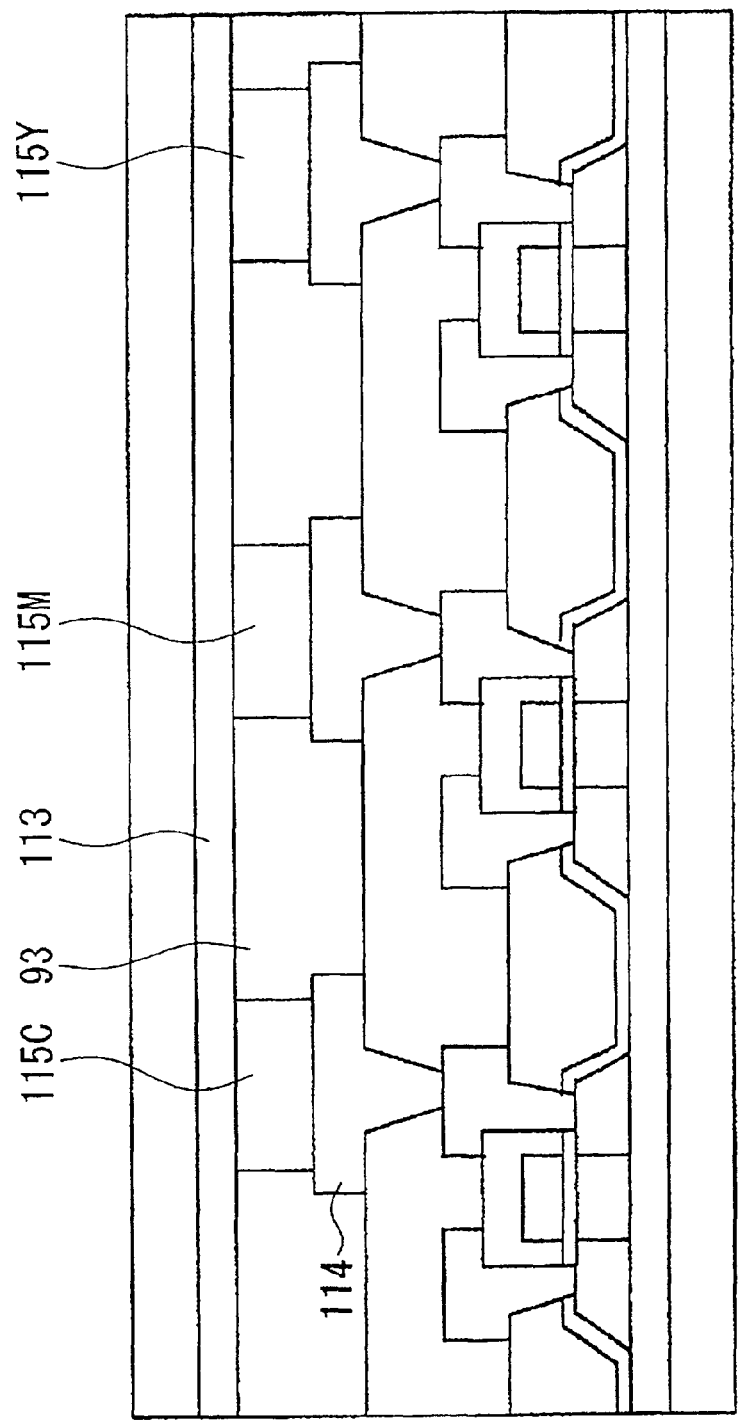
FIG. 9 is a sectional view showing a structure of a selected part of a 'color' electrophoretic display using different colored electrophoretic ink layers with respect to a color pixel.

One modification can be proposed for the electrophoretic display to provide 'colored' visual representations instead of 'monochrome' visual representations. The monochrome display is actualized using a single thin-film transistor with respect to each pixel as shown in FIG. 1. The color display is actualized using three thin-film transistors with respect to each pixel, which is shown in FIG. 9. That is, an entire area of the electrophoretic ink layer 115, which is arranged between the common electrode 113 and the pixel electrode 114, is partitioned into three layers by intervention of two banks 93 respectively. Hence, the partitioned three layers are named a cyan-color electrophoretic ink layer 115C, a magenta-color electrophoretic ink layer 115M, and a yellow-color electrophoretic ink layer 115Y, which are arranged below the common electrode 113 and in connection with the divided three portions of the pixel electrode 114. The divided three portions of the pixel electrode 114 are respectively controlled in switching voltage by three thin-film transistors respectively. Therefore, a combination of the three electrophoretic ink layers 115C, 115M and 115Y that are respectively controlled in switching voltage by a combination of the three thin-film transistors is used to form one color pixel for the electrophoretic display. By adequately arranging combinations of these electrophoretic ink layers over an entire area of the display surface, it is possible to form a 'color' electrophoretic display. Applying voltage to the respective ink layers is controlled in response to a display color pattern, so that the electrophoretic display is able to display a color image on its display surface.

The electrophoretic display of this invention is applicable to a variety of electronic devices having displays; therefore, the application of this invention is not necessarily limited to electronic books, an example of which is described as the foregoing embodiment. Next, descriptions will be given with respect to other examples of the electronic devices, each of which is able to use the electrophoretic display of this invention.

1. Mobile Computer

Figure 10:
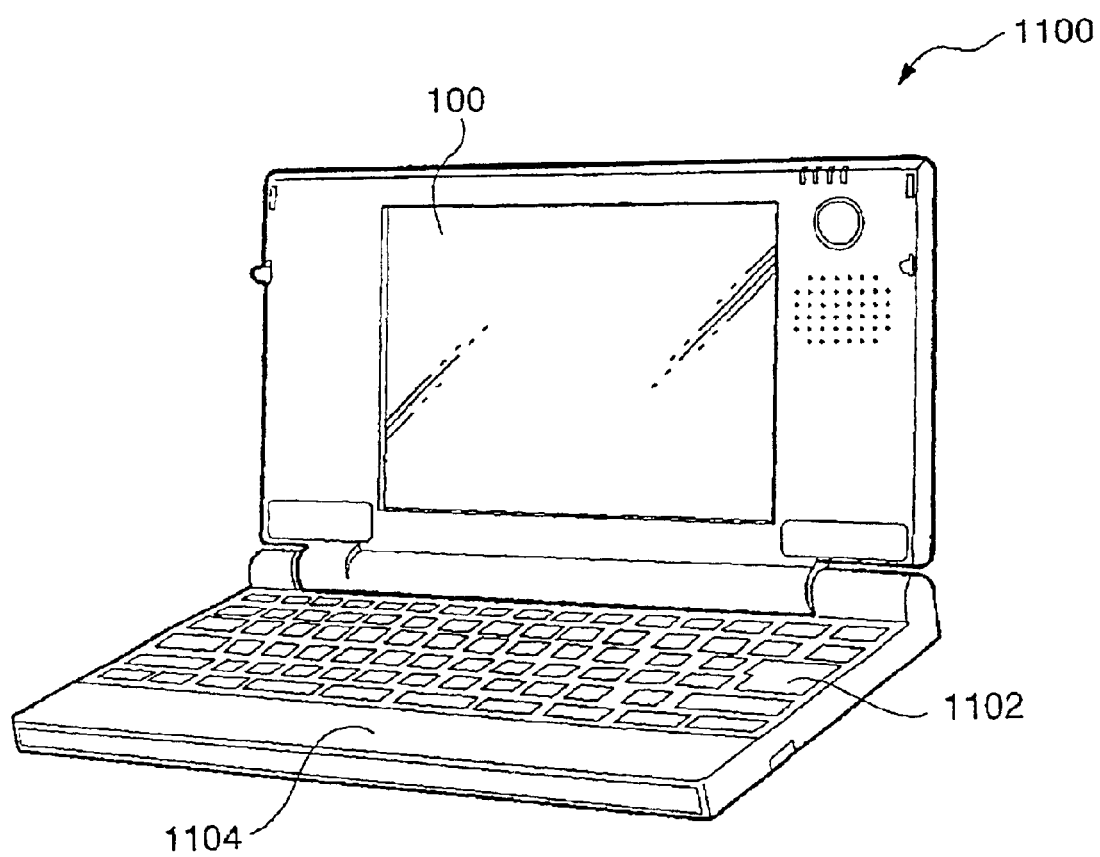
FIG. 10 is a perspective view showing an external appearance of a mobile personal computer whose display corresponds to the electrophoretic display.

A brief description will be given with respect to an example of a personal computer of a mobile type (or portable type) to which the electrophoretic display of this invention is applied. FIG. 10 shows an external appearance of a personal computer 1100, which basically comprises a main unit 1104 providing a keyboard 1102, and a display unit whose display 100 corresponds to the electrophoretic display.

2. Cellular Phone

Figure 11:
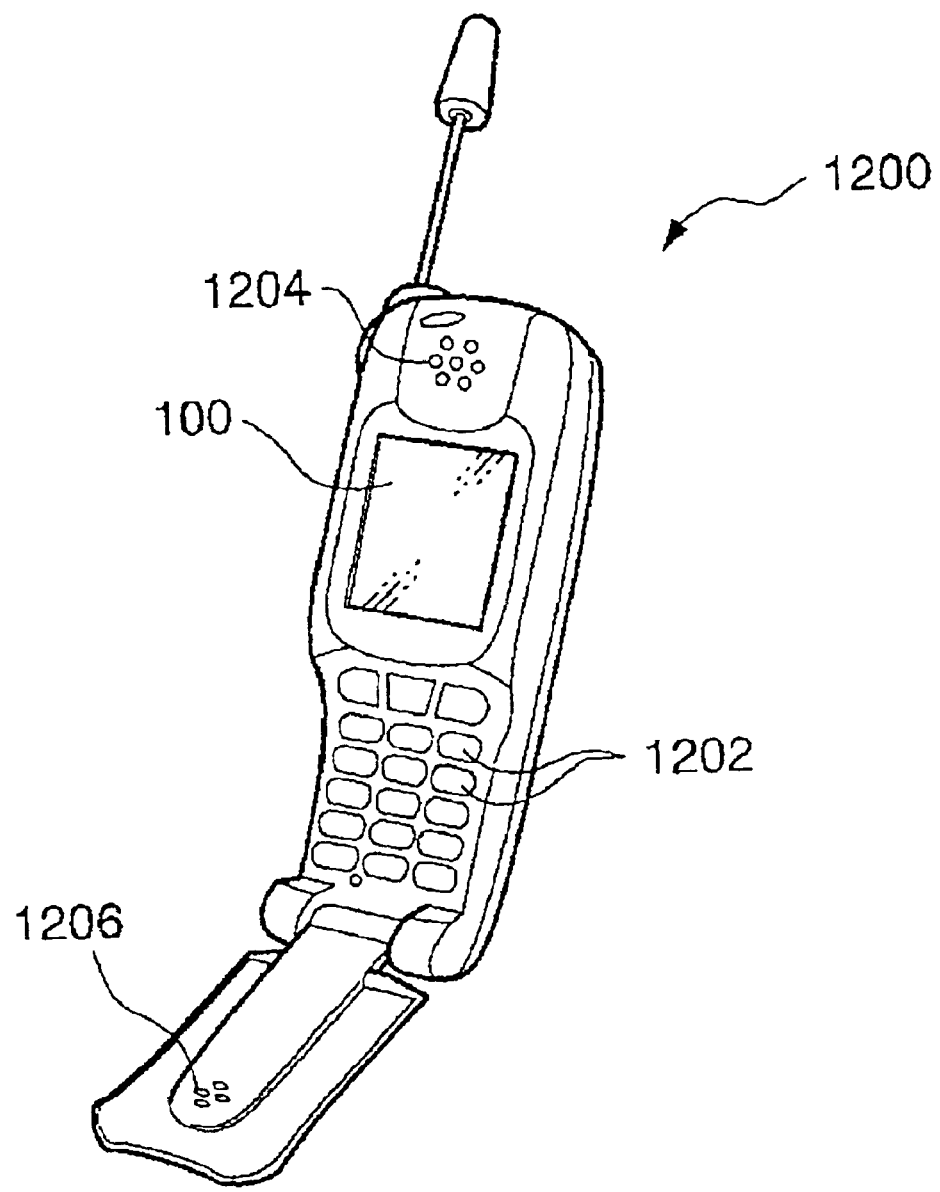
FIG. 11 is a perspective view showing an external appearance of a cellular phone whose display corresponds to the electrophoretic display.

A brief description will be given with respect to an example of a cellular phone to which the electrophoretic display of this invention is applied. FIG. 11 shows an external appearance of a cellular phone 1200, which basically comprises numeric keys and function keys 1202, an earpiece 1204, a mouthpiece 1206, and a small-size display 100 that corresponds to the electrophoretic display.

3. Digital Still Camera

Figure 12:
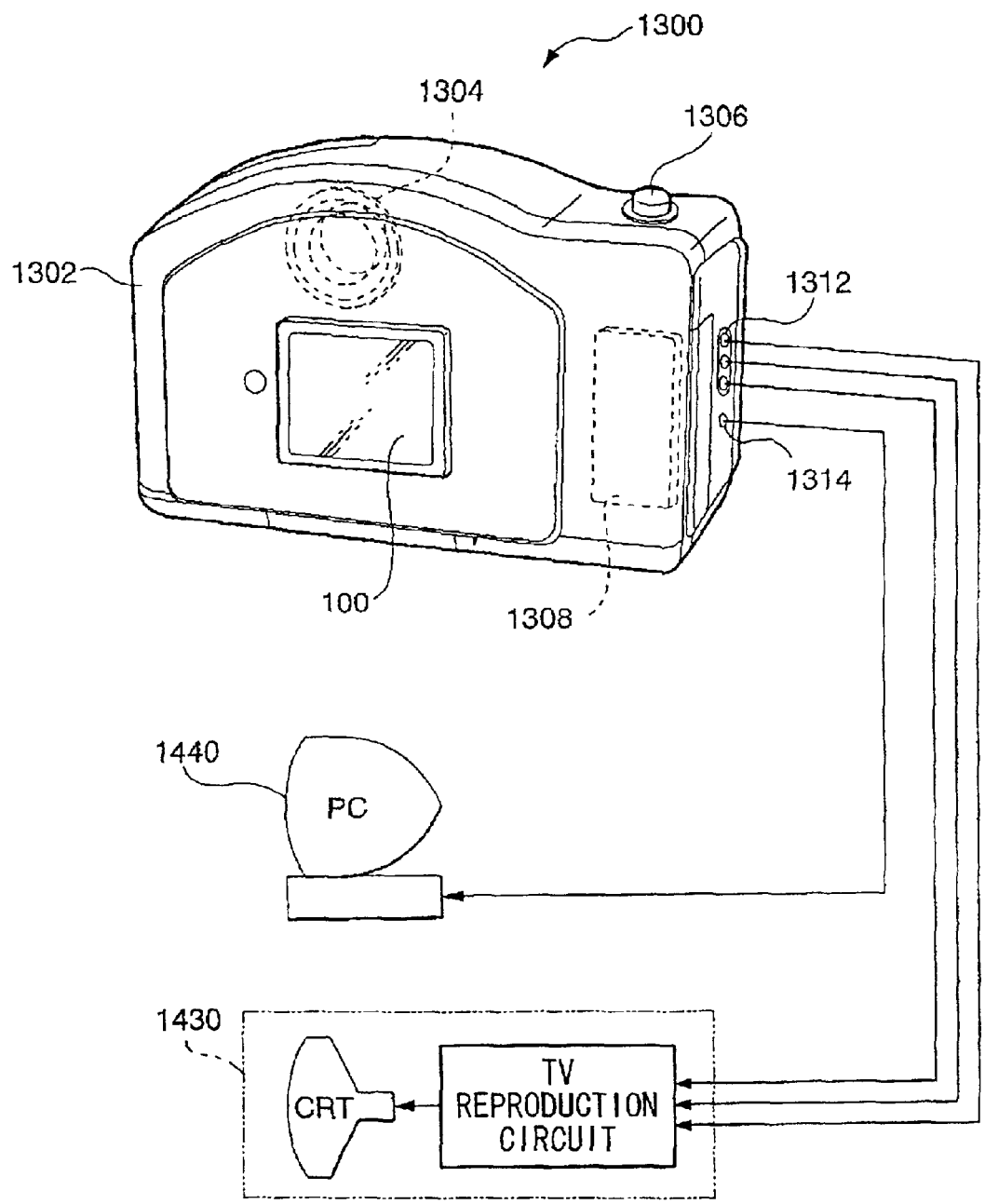
FIG. 12 is a back view of a digital still camera and its connections.

A brief description will be given with respect to an example of a digital still camera to which the electrophoretic display of this invention is applied. FIG. 12 shows a backside appearance of a digital still camera 1300 and its connections to external devices.

Normal cameras are designed to provide exposures on films in response to optical images of photographed subjects. In contrast, the digital still camera 1300 uses an image pickup device such as a CCD (i.e., Charge Coupled Device) to pick up an optical image of a photographed subject, based on which image pickup signals representing a photographed image are produced by photoelectric conversion. A display 100 corresponding to the electrophoretic display is arranged at a prescribed area of a backside surface of a case 1302 of the digital still camera 1300. This display 100 displays pictures that are produced based on image pickup signals for a viewer. That is, the display 100 acts as a viewfinder for a photographer. A light sensing unit is embedded in the backside of the case 1302 to provide various parts for optics such as optical lenses and a CCD.

When a photographer pushes a shutter button 1306 while watching a photographed subject that is displayed on a screen of the display 100, the CCD produces image pickup signals, representing a photographed image, which are transferred and stored in a memory on a circuit board 1308 embedded in the backside of the case 1302 at its right area. At a right side of the case 1302, the digital still camera 1300 provides video signal output terminals 1312 and an input/output terminal 1314 for data communication. Therefore, it is possible to connect the digital still camera 1300 with a television monitor 1430 by way of cables connected to the video signal output terminals 1312. In addition, it is possible to connect the digital still camera 1300 with a personal computer 1440 by way of a data communication cable connected to the input/output terminal 1314. By adequately operating switches and controls (not shown) of the digital still camera 1300, it is possible to output image pickup signals, which are once stored in the memory on the circuit board 1308, to a television signal reproduction circuit of the television monitor 1430 or a main unit of the personal computer 1440.

4. Electronic Paper

Figure 13:
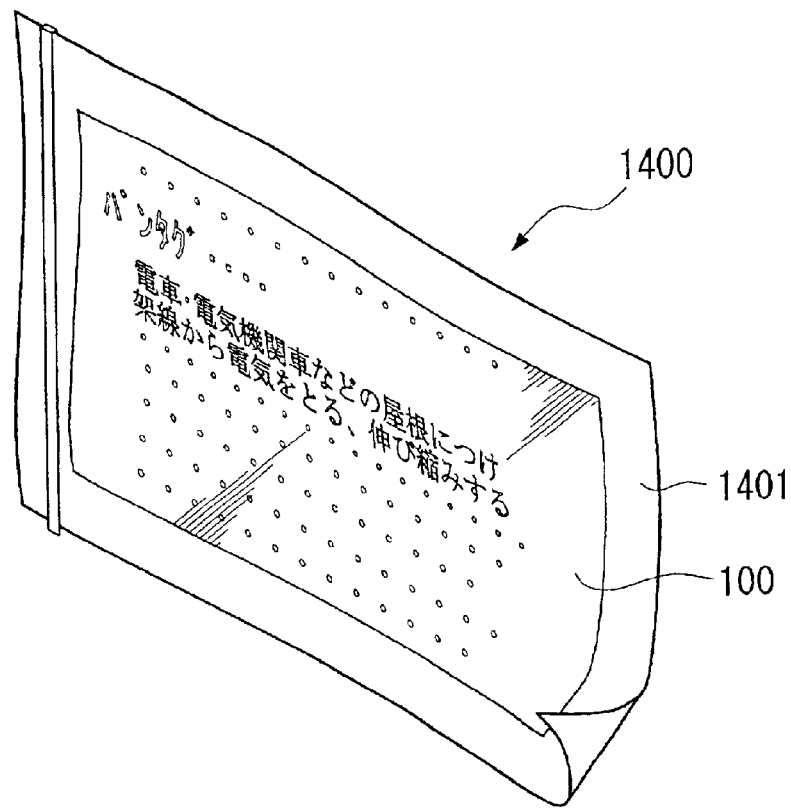
FIG. 13 is a perspective view showing an electronic paper whose display corresponds to the electrophoretic display.

A brief description will be given with respect to an example of a 'flexible' electronic paper to which the electrophoretic display of this invention is applied. FIG. 13 shows an external appearance of an electronic paper 1400, which basically comprises a rewritable sheet 1401 that has similar touch and flexibility of conventional papers, and a display 100 corresponding to the electrophoretic display.

Figure 14:
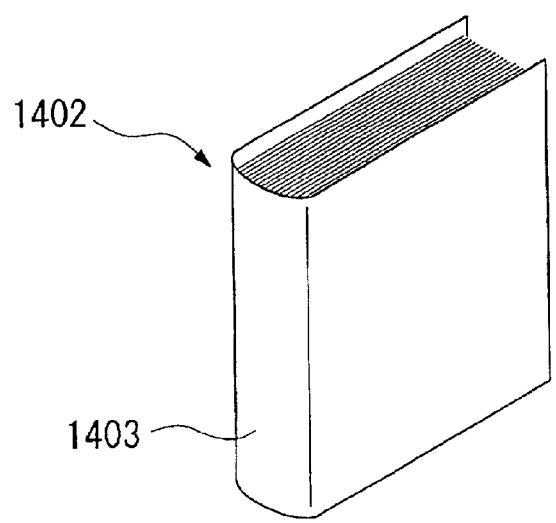
FIG. 14 is a perspective view showing an electronic notebook for binding together electronic papers.

FIG. 14 shows an external appearance of an electronic notebook 1402 in which a number of electronic papers 1400 are bound together with a note cover 1403. The note cover 1403 provides a display data input device (not shown) that is used to input display data from the external device. In response to the display data, it is possible to change or update the display content with respect to each of the electronic papers 1400 bound together with the note cover 1403.

We have listed various examples for the application of the electrophoretic display such as the electronic book of FIG. 3, the personal computer of FIG. 10, the cellular phone of FIG. 11, the digital still camera of FIG. 12, and the electronic paper of FIG. 13. Of course, it is possible to list other examples such as the liquid crystal display television set, videotape recorder of the viewfinder type or monitor type, car navigation device, pager, electronic picket notebook, electronic calculator, word processor, workstation, television phone, POS terminal, and other devices having touch panels. The electrophoretic display of this invention can be used as displays for the aforementioned devices.

As described heretofore, this invention has a variety of technical features and effects, which are described below.

(1) The electrophoretic display of this invention is designed to simultaneously erase the overall display content over the entire area of the display surface in order to change the old display content with new one. Herein, the old display content is completely rewritten with the new display content. This is realized by a unique drive method for use in the active-matrix type electrophoretic display of this invention, by which it is possible to improve the reliability in rewriting display contents on the display surface of the electrophoretic display.

(2) To write the new display content, this invention introduces a prescribed relationship of potentials between the common electrode and pixel electrode with respect to each of pixels, wherein an absolute value of the electric potential of the common electrode is made lower than an absolute value of the electric potential of the pixel electrode. This eliminates the necessity for maintaining the pixel electrode at the high electric potential after the writing operation, which yields reduction of the risk in occurrence of write errors.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalents of such metes and bounds are therefore intended to be embraced by the claims. The entire disclosures of Japanese Patent Application No. 2000-263565 filed Aug. 31, 2000 and Japanese Patent Application No. 2001-233811 filed Aug. 1, 2001 are incorporated herein by reference.

What is claimed is:

1. An electrophoretic display comprising:
    a plurality of pixel electrodes that are provided independently with respect to pixels uniformly arranged above a display surface;
    an active-matrix array of switching elements comprised of thin-film transistors that are respectively connected with the pixel electrodes;
    a substrate having a common electrode that covers an entire area corresponding to the display surface; and
    an electrophoretic ink layer in which a plurality of charged pigment particles are contained and dispersed in a solution;
    wherein the common electrode and the pixel electrodes are respectively driven at different electric potentials causing electric fields by which the charged pigment particles move in desired directions to form a desired display content emerging above the display surface in response to display data, which is rewritten in such a manner that the display content is erased at once from the entire area corresponding to the display surface such that a prescribed voltage is applied between the common electrode and the pixel electrodes while all the pixel electrodes are set to a same electric potential and is then rewritten with a new one.

2. An electrophoretic display according to claim 1, wherein a first common voltage is applied between the common electrode and the pixel electrodes to erase the display content from the entire area corresponding to the display surface, while a second common voltage is alternatively applied between the common electrode and the pixel electrodes to rewrite the display content with the new one.

3. An electrophoretic display according to claim 1, wherein voltages respectively applied to the common electrode and the pixel electrodes are both not greater than 20V.

4. An electrophoretic display according to claim 1, wherein voltages respectively applied to the common electrode and the pixel electrodes are both not greater than 15V.

5. An electrophoretic display according to claim 1, wherein voltages respectively applied to the common electrode and the pixel electrodes are both not greater than 10V.

6. An electrophoretic display according to claim 1, wherein the charged pigment particles and the dyed solution are contained in a plurality of microcapsules, which are linearly arranged within the electrophoretic ink layer.

7. An electrophoretic display according to claim 1, wherein the thin-film transistors are low-temperature processed polysilicon thin-film transistors.

8. An electrophoretic display according to claim 1, wherein at least channels of the thin-film transistors are made by organic films.

9. An electrophoretic display according to claim 1, wherein an absolute value of an electric potential of the common electrode is normally set lower than absolute values of electric potentials of the pixel electrodes in order to rewrite the display content with the new one.

10. An electrophoretic display according to claim 1, wherein a reference color is defined when an absolute value of an electric potential of the common electrode is set higher than absolute values of electric potentials of the pixel electrodes.

11. An electronic apparatus having the electrophoretic display as defined in claim 1.

12. An electrophoretic display comprising:
    a transparent substrate that forms a display surface;
    a common electrode that covers an entire area corresponding to the display surface;
    a plurality of pixel electrodes that are arranged under the common electrode and in connection with pixels respectively;
    a plurality of thin-film transistors whose drain electrodes are connected to the plurality of pixel electrodes respectively, so that each of the pixel electrodes is independently controlled in electric potential by switching each of the thin-film transistors; and
    an electrophoretic ink layer that contains a plurality of microcapsules linearly arranged between the common electrode and the pixel electrodes;
    wherein each of the microcapsules contain a number of electrically charged particles dispersed in a liquid, each of which being different in color;
    both of the electrically charged particles and the liquid are set to approximately an equal specific gravity within the microcapsule; and
    all of the pixel electrodes are simultaneously set to a low electric potential while the common electrode is set to a high electric potential so that a display content is erased from the entire area corresponding to the display surface at once, and then the pixel electrodes are driven in response to display data while the common electrode is set to the low electric potential so that the display content is rewritten with a new one in response to the display data.

13. An electrophoretic display comprising:
    a plurality of pixel electrodes that are provided independently with respect to pixels uniformly arranged above a display surface;
    an active-matrix array of switching elements that are respectively connected with the pixel electrodes;
    a substrate having a common electrode that covers an entire area corresponding to the display surface;
    an electrophoretic ink layer in which a plurality of charged pigment particles are contained and dispersed in a solution; and
    a plurality of integrated circuits including data drivers and scan drivers for driving the switching elements;
    wherein the common electrode and the pixel electrodes are respectively driven at different electric potentials causing electric fields by which the charged pigment particles move in desired directions to form a desired display content emerging above the display surface in response to display data, which is rewritten in such a manner that the display content is erased at once from the entire area corresponding to the display surface such that a prescribed voltage is applied between the common electrode and the pixel electrodes while all the pixel electrodes are set to a same electric potential and is then rewritten with a new one.

* * * * *

UNITED STATES PATENT AND TRADEMARK OFFICE
CERTIFICATE OF CORRECTION

PATENT NO. : 6,987,503 B2
APPLICATION NO. : 09/941541
DATED : January 17, 2006
INVENTOR(S) : Satoshi Inoue It is certified that error appears in the above-identified patent and that said Letters Patent is hereby corrected as shown below:

Title Page, References Cited, Item (56):

Insert under U.S. PATENT DOCUMENTS:
-- 6,518,949   2/2003    Drzaic           345/107
5,053,763      10/1991   DiSanto et al.   345/107
6,535,197      3/2003    Comiskey et al.  345/107
6,312,304      11/2001   Duthaler et al.  445/24
6,531,997      3/2003    Gates et al.     345/107 --

Signed and Sealed this

Twenty-third Day of January, 2007

JON W. DUDAS
*Director of the United States Patent and Trademark Office*